US010877974B2

(12) United States Patent
Morozov et al.

(10) Patent No.: US 10,877,974 B2
(45) Date of Patent: *Dec. 29, 2020

(54) STATISTICAL IDENTIFICATION OF INSTANCES DURING RECONCILIATION PROCESS

(71) Applicant: BMC Software, Inc., Houston, TX (US)

(72) Inventors: Vitaly Morozov, Irvine, CA (US); Eric Humphrey, Columbus, OH (US)

(73) Assignee: BMC Software, Inc., Houston, TX (US)

( * ) Notice: Subject to any disclaimer, the term of this patent is extended or adjusted under 35 U.S.C. 154(b) by 180 days.

This patent is subject to a terminal disclaimer.

(21) Appl. No.: 16/254,098

(22) Filed: Jan. 22, 2019

(65) Prior Publication Data
US 2019/0155810 A1    May 23, 2019

Related U.S. Application Data

(63) Continuation of application No. 15/072,948, filed on Mar. 17, 2016, now Pat. No. 10,198,476, which is a (Continued)

(51) Int. Cl.
*G06F 16/2455* (2019.01)
*G06F 16/27* (2019.01)
(Continued)

(52) U.S. Cl.
CPC .... *G06F 16/24564* (2019.01); *G06F 16/2365* (2019.01); *G06F 16/2462* (2019.01);
(Continued)

(58) Field of Classification Search
None
See application file for complete search history.

(56) References Cited

U.S. PATENT DOCUMENTS 5,392,390 A    2/1995 Crozier
5,761,505 A    6/1998 Golson
(Continued)

OTHER PUBLICATIONS

"BMC Atrium CMDB 75.00 Patch 001, Normalization and Reconciliation Guide", Mar. 2009, 132 pages.
(Continued)

*Primary Examiner* — Uyen T Le
(74) *Attorney, Agent, or Firm* — Brake Hughes Bellermann LLP

(57) ABSTRACT

A system for reconciling object for a configuration management databases employs statistical rules to reduce the amount of manual identification required by conventional reconciliation techniques. As users manually identify matches between source and target datasets, statistical rules are developed based on the criteria used for matching. Those statistical rules are then used for future matching. A threshold value is adjusted as the statistical rules are used, incrementing the threshold value when the rule successfully matches source and target objects. If the threshold value exceeds a predetermined acceptance value, the system may automatically accept a match made by a statistical rule. Otherwise, suggestions of possibly applicable rules may be presented to a user, who may use the suggested rules to match objects, causing adjustment of the threshold value associated with the suggested rules used.

21 Claims, 7 Drawing Sheets

Related U.S. Application Data continuation of application No. 14/204,437, filed on Mar. 11, 2014, now Pat. No. 9,323,801, which is a continuation of application No. 12/860,334, filed on Aug. 20, 2010, now Pat. No. 8,712,979.

(60) Provisional application No. 61/318,116, filed on Mar. 26, 2010.

(51) Int. Cl.
*G06F 16/28* (2019.01)
*G06F 16/23* (2019.01)
*G06F 16/2458* (2019.01)
*G06F 16/9032* (2019.01)

(52) U.S. Cl.
CPC .......... *G06F 16/273* (2019.01); *G06F 16/285* (2019.01); *G06F 16/90324* (2019.01)

(56) References Cited

U.S. PATENT DOCUMENTS

| | | | |
|---|---|---|---|
| 5,946,681 A | 8/1999 | Shorter | |
| 5,948,055 A | 9/1999 | Pulsipher et al. | |
| 5,991,877 A | 11/1999 | Luckenbaugh | |
| 6,041,058 A | 3/2000 | Flanders et al. | |
| 6,212,266 B1 | 4/2001 | Busuioc | |
| 6,266,513 B1 | 7/2001 | Briancon | |
| 6,286,047 B1 | 9/2001 | Ramanathan et al. | |
| 6,336,138 B1 | 1/2002 | Caswell et al. | |
| 6,496,838 B1 | 12/2002 | Zamora-McKelvy et al. | |
| 6,820,090 B2 | 11/2004 | Chambers et al. | |
| 6,836,798 B1 | 12/2004 | Adams | |
| 7,003,402 B2 | 2/2006 | Christie et al. | |
| 7,082,426 B2 | 7/2006 | Musgrove et al. | |
| 7,146,380 B2 | 12/2006 | Schaepe et al. | |
| 7,155,427 B1 | 12/2006 | Prothia et al. | |
| 7,346,044 B1 | 3/2008 | Chou et al. | |
| 7,380,025 B1 | 5/2008 | Riggins et al. | |
| 7,395,256 B2 | 7/2008 | Ji et al. | |
| 7,693,731 B1 | 4/2010 | Weber et al. | |
| 8,166,002 B2 | 4/2012 | Robinson et al. | |
| 8,554,750 B2 | 10/2013 | Rangarajan et al. | |
| 8,683,032 B2 | 3/2014 | Spinelli et al. | |
| 8,712,979 B2 | 4/2014 | Morozov et al. | |
| 8,799,436 B2 | 8/2014 | Ayachitula et al. | |
| 9,137,115 B2 | 9/2015 | Mayfield et al. | |
| 9,158,799 B2 | 10/2015 | Morozov | |
| 9,967,162 B2 | 5/2018 | Spinelli et al. | |
| 2002/0002555 A1 | 1/2002 | Wolman et al. | |
| 2002/0009085 A1 | 1/2002 | Barkai et al. | |
| 2002/0143935 A1 | 10/2002 | Schenkel et al. | |
| 2002/0184529 A1 | 12/2002 | Foster et al. | |
| 2003/0058813 A1 | 3/2003 | Viola et al. | |
| 2003/0126108 A1 | 7/2003 | Martino et al. | |
| 2003/0200294 A1 | 10/2003 | Thorpe et al. | |
| 2004/0019672 A1 | 1/2004 | Das et al. | |
| 2004/0025157 A1 | 2/2004 | Blight et al. | |
| 2004/0143600 A1 | 7/2004 | Musgrove | |
| 2004/0146008 A1 | 7/2004 | Conradt et al. | |
| 2004/0220963 A1 | 11/2004 | Chen et al. | |
| 2004/0264435 A1 | 12/2004 | Chari et al. | |
| 2005/0038889 A1 | 2/2005 | Frietsch | |
| 2005/0080613 A1 | 4/2005 | Colledge et al. | |
| 2005/0111362 A1 | 5/2005 | Freytsis et al. | |
| 2005/0216433 A1 | 9/2005 | Bland et al. | |
| 2005/0234973 A1 | 10/2005 | Zeng et al. | |
| 2006/0059253 A1 | 3/2006 | Goodman et al. | |
| 2006/0064481 A1 | 3/2006 | Baron et al. | |
| 2006/0069801 A1 | 3/2006 | Rich et al. | |
| 2006/0080656 A1 | 4/2006 | Cain et al. | |
| 2006/0106590 A1 | 5/2006 | Tseng et al. | |
| 2006/0123104 A1 | 6/2006 | Spinelli et al. | |
| 2006/0123393 A1 | 6/2006 | Atkins et al. | |
| 2006/0136459 A1 | 6/2006 | Trinon et al. | |
| 2006/0136585 A1 | 6/2006 | Mayfield et al. | |
| 2006/0178954 A1 | 8/2006 | Thukral et al. | |
| 2006/0179124 A1 | 8/2006 | Stefaniak et al. | |
| 2006/0271341 A1 | 11/2006 | Brown et al. | |
| 2007/0097959 A1 | 5/2007 | Taylor | |
| 2007/0150562 A1 | 6/2007 | Stull et al. | |
| 2007/0239700 A1 | 10/2007 | Ramachandran | |
| 2008/0021917 A1 | 1/2008 | Baker et al. | |
| 2008/0183724 A1 | 7/2008 | Mueller | |
| 2008/0301081 A1 | 12/2008 | Karnik et al. | |
| 2009/0063562 A1 | 3/2009 | Dinger et al. | |
| 2009/0094462 A1 | 4/2009 | Madduri | |
| 2009/0319932 A1 | 12/2009 | Robinson | |
| 2010/0161577 A1 | 6/2010 | Morozov | |
| 2011/0238637 A1 | 9/2011 | Morozov et al. | |
| 2012/0259812 A1 | 10/2012 | Rangarajan et al. | |
| 2013/0007011 A1 | 1/2013 | Setlur et al. | |
| 2013/0124681 A1 | 5/2013 | Rudenko et al. | |
| 2014/0143416 A1 | 5/2014 | Spinelli et al. | |
| 2014/0195504 A1 | 7/2014 | Morozov et al. | |
| 2014/0279992 A1 | 9/2014 | Morozov | |
| 2015/0381419 A1 | 12/2015 | Kumar et al. | |
| 2016/0034503 A1 | 2/2016 | Morozov | |
| 2017/0206061 A1* | 7/2017 | Kumar | G06F 16/24578 |

OTHER PUBLICATIONS

"BMC Atrium CMDB 75.00", User's Guide, 71 pages, Jan. 2009.
"BMC Atrium Core 7.6.00; Concepts and Planning Guide", Sep. 2009, pp. 1-164.
"BMC Atrium Core 7.6.00; Normalization and Reconciliation Guide", Sep. 2009, pp. 1-148.
"BMC Atrium Core 7.6.00; User's Guide", Sep. 2009, pp. 1-78.
"Configuration Management Database (CMDB) Federation Specification", Document No. DSP0252, Version: 1.0.0, Jun. 22, 2009, 73 pages.
"The Four Challenges of Customer-Centric Data Warehousing" Carleton Corporation. Nov. 1998, pp. 1-14.
European Search Report for European Patent Application No. 05257482.9, dated Apr. 3, 2006, 8 pages.
European Search Report for European Patent Application No. 05257483.7, dated Mar. 31, 2006, 7 pages.

* cited by examiner

STATISTICAL IDENTIFICATION OF INSTANCES DURING RECONCILIATION PROCESS

CROSS-REFERENCE TO RELATED APPLICATIONS

This application is a continuation of U.S. application Ser. No. 15/072,948, filed Mar. 17, 2016, which is a continuation of U.S. application Ser. No. 14/204,437, filed Mar. 11, 2014, now U.S. Pat. No. 9,323,801, which is a continuation of U.S. application Ser. No. 12/860,334 entitled "Statistical Identification of Instances During Reconciliation Process" filed Aug. 20, 2010, now U.S. Pat. No. 8,712,979, which claims priority to U.S. Provisional Application Ser. No. 61/318,116 entitled "Method of Statistical Identification of the Instances During Reconciliation Process" filed Mar. 26, 2010, and which are incorporated by reference in their entirety herein. This application also claims subject matter that is related to the subject matter described in U.S. patent application Ser. No. 12/570,628, entitled "Method of Reconciling Resources in the Metadata Hierarchy," filed on Sep. 30, 2009, and U.S. patent application Ser. No. 11/204,189, entitled, "Resource Reconciliation," filed on Aug. 15, 2005, which applications are hereby incorporated by reference in their entireties.

BACKGROUND

This disclosure relates generally to the field of management of information technology (IT) services. More particularly, but not by way of limitation, it relates to a technique for improving the reconciliation of resources in an ITIL®-based (Information Technology Infrastructure Library) Configuration Management Database (CMDB). (ITIL is a registered trademark of The Lords Commissioners of Her Majesty's Treasury acting through The Office of Government Commerce and Central Computer and Telecommunications Agency, United Kingdom.) ITIL-based CMDBs are emerging as a prominent technology for enterprise management software.

In enterprise systems management, data about IT business entities such as servers and applications are generally spread across several repositories, known as Management Data Repositories (MDRs). This data is made available to software applications through various standard and non-standard mechanisms such as Structured Query Language (SQL) and/or other proprietary programming interfaces.

The usefulness of these CMDBs is dependent on the quality, reliability, and security of the data stored in them. A CMDB often contains data about managed resources known as Configuration Items (CIs). In general, CIs correspond to real-world elements, components, or objects. ITIL version 3 defines a CI as "Any Component that needs to be managed in order to deliver an IT Service. Information about each CI is recorded in a Configuration Record within the Configuration Management System and is maintained throughout its Lifecycle by Configuration Management. CIs are under the control of Change Management. CIs typically include IT Services, hardware, software, buildings, people, and formal documentation such as Process documentation and [Service Level Agreements]."

The CMDB serves as a point of integration between various IT management processes. Data from multiple sources often needs to be managed directly or by reference in commercial CMDBs. As different discovery processes may encounter the same object, it is important to identify such situations, and then merge and/or consolidate the information provided by the different processes for each object to avoid creating duplicate objects. This process is often called "reconciliation" or "resource reconciliation," and is described more fully in the document entitled, "BMC Atrium CMDB 7.6.00: Normalization and Reconciliation Guide," which is hereby incorporated by reference in its entirety.

Resource reconciliation processes typically consist of two primary operations: (1) identifying instances of objects of the same type, and (2) merging those instances that can be determined to refer to the same real world object. Instances identification is usually based on specific predefined rules considered in a specific priority order. Typically, a first rule is examined for an unidentified CI and if no match is found, the next rule in the list is tested, continuing until a match is found, or no more rules remain in the list. If none of the rules match, the CI can be auto-identified by assigning it a new identification property (Reconciliation ID) or left for manual identification. Auto-identification can lead to potential duplicates of CIs in the CMDB and is generally not recommended for ongoing resources reconciliation. Instead, most unidentified instances are in practice flagged for manual identification.

Manual identification is very time consuming and may need to be performed repeatedly. Because CMDBs tend to contain large numbers of CIs, in many cases containing 1,000,000 or more CIs, the amount of time needed for manual identification can be very large. Some studies suggest that about 20 percent of CIs have to go through manual identification. At 10 minutes per instance, manually identifying 200,000 instances out of 1,000,000 would require over 33,000 hours.

SUMMARY

In one embodiment, a method is disclosed. The method comprises selecting a first object from a source dataset; evaluating a rule against the first object and a second object of a target dataset of a configuration management database; marking the first object as identified with the second object upon successful evaluation of the rule if a threshold value associated with the rule exceeds a predetermined acceptance value; and adjusting the threshold value responsive to the act of marking.

In another embodiment, a non-transitory computer readable medium is disclosed. The non-transitory computer readable medium has instructions for a programmable control device stored thereon wherein the instructions cause a programmable control device to perform the method disclosed above.

In yet another embodiment, a networked computer system is disclosed. The networked computer system comprises a plurality of computers communicatively coupled, at least one of the plurality of computers programmed to perform at least a portion of the method disclosed above, wherein the entire method disclosed above is performed collectively by the plurality of computers.

In yet another embodiment, a configuration management database system is disclosed. The configuration management database system comprises a configuration management database server; a configuration management database, coupled to the configuration management database server; a reconciliation engine, coupled to the configuration management database server, and configured to match a plurality of objects provided to the configuration management database system from a plurality of source datasets with objects contained in the configuration management database; and a statistical rules engine, coupled to the configuration management database server and configured to apply a statistical rule to match first object of the plurality of objects with a second object contained in the configuration management database responsive to a threshold value associated with the statistical rule, wherein the first object was not matched with any objects contained in the configuration management database by the reconciliation engine.

DETAILED DESCRIPTION

Figure 1:
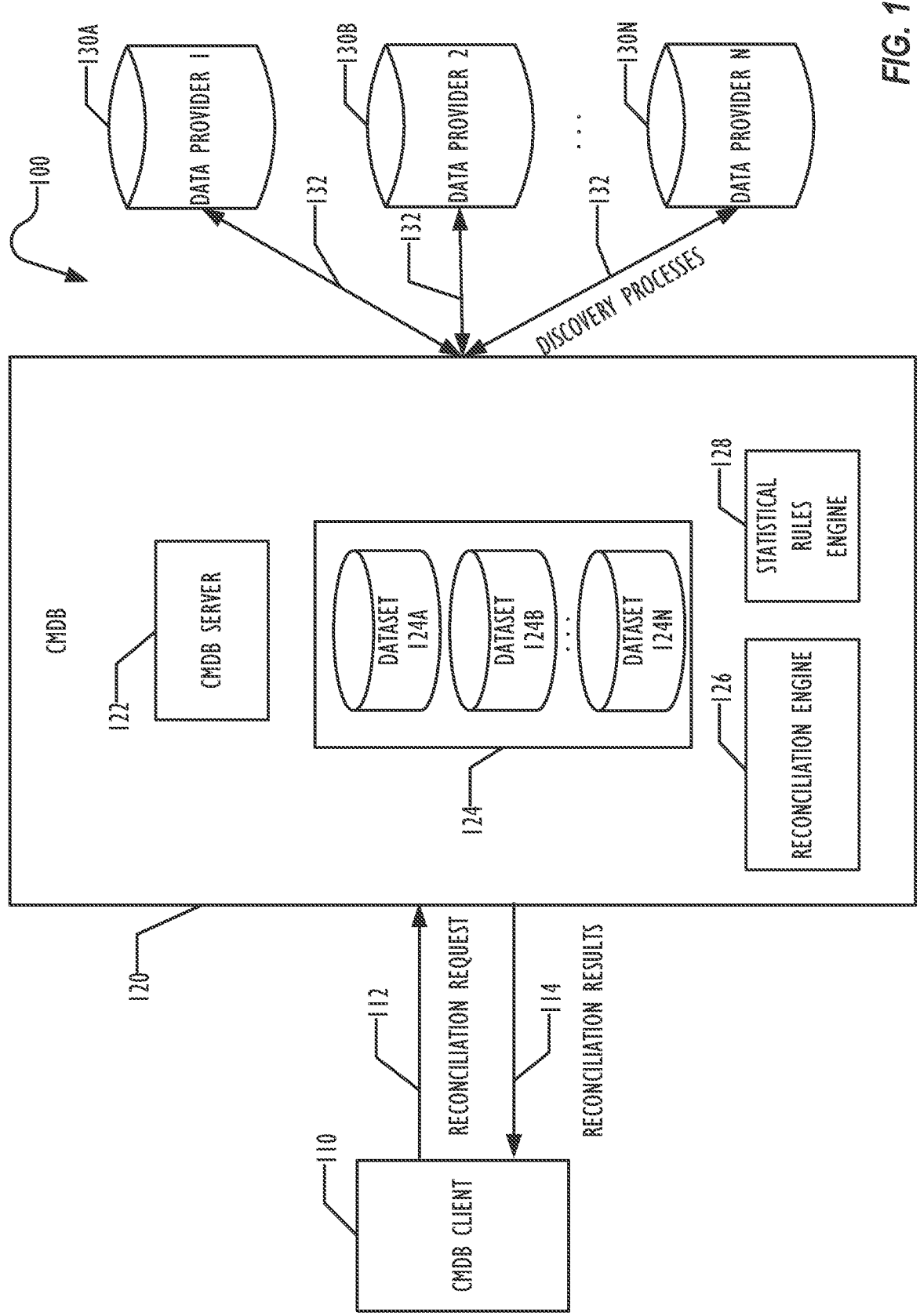
FIG. 1 illustrates, in block diagram form, an example of a CMDB system that provides for reconciliation using statistical rules according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

An enhanced resource reconciliation technique in accordance with one embodiment disclosed herein could examine unidentified instances of configuration objects within a particular "data partition" (sometimes called a dataset) of an enterprise CMDB and perform reconciliation against a target dataset, such as a production dataset, using statistical rules to assist with the identification.

Datasets are arbitrary partitions of configuration management data. Partitioning is a powerful tool that may be used for many purposes. For example, a particular dataset may represent production data, obsolete data, a future data state, or data provided by different discovery applications. Datasets within an enterprise environment may contain different versions of the same set of CIs and relationships. Datasets may also hold different collections of data, for example, a subset of the enterprise's overall data, such as departments or regions; data from different companies, such as in the case of a multitenant architecture; or test data.

A dataset typically comprises a collection of CIs and relationships for a given purpose. Together, they form a picture of some state or time or configuration of the enterprise environment. Within a dataset, there is typically only one instance of a given CI. An instance might also exist for that CI in other datasets to represent the CI in the contexts of those datasets. Instances representing the same CI or relationship across datasets may share the same reconciliation identity, or reconciliation ID.

Reconciling resources in multiple datasets may allow different providers to populate their own provider data partitions, but still allow the CMDB to have the ability to merge the instances within the various data partitions into a single, unified resource data partition without duplicates. Illustrative "resources" include, but are not limited to, computer systems, components of computer systems, data storage systems, switches, routers, memory, software applications (e.g., accounting and database applications), operating systems and business services (e.g., order entry services and change management and tracking services).

FIG. 1 illustrates, in block diagram form, an exemplary CMDB system 100, comprising a CMDB 120, a CMDB client application 110, and a plurality of data providers 130A-N according to one embodiment. CMDB 120 may be comprised of a CMDB server 122, a plurality of datasets 124 stored in a storage medium, such as random access memory (RAM) or non-volatile memory sources, a reconciliation engine 126, and a statistical rules engine 128. The reconciliation engine and the statistical rules engine are described in more detail below. The CMDB 120 may potentially be populated with configuration objects by various different discovery processes 132. As different discovery processes 132 may encounter the same object, it is important to identify such situations, and then merge and/or consolidate the information provided by the different processes for each object to avoid creating duplicate objects.

CMDB client application 110 is capable of defining and executing reconciliation requests that can be triggered to run at various times, e.g., each time a new resource or CI is created in a provider data partition 130, at specified intervals based on scheduling criteria, or on demand. CIs are most often created by discovery applications, such as discovery processes 132. However, CIs may also be created manually. For example, if a new computer system has been installed, and the user does not want to wait until the running of the next scheduled discovery process to include the CI representative of the newly installed computer system in the CMDB, the user may create it manually. The CMDB client application 110 may also be engaged by another computer program or process or a human end-user. The CMDB client application 110 may comprise, for example, a user interface where reconciliation properties are defined and the parameters of the reconciliation request are specified. The parameters of the reconciliation request may serve in some manner to limit the number or types of configuration objects that are considered by the reconciliation process, e.g., a reconciliation request may only look at a specific dataset or may specify specific merging precedences for particular datasets.

The reconciliation request 112 may be sent to the CMDB 120, wherein reconciliation engine 126 may initiate a reconciliation process according to specified reconciliation properties and parameters, attempting to identify unidentified instances of CIs in datasets 124 within the CMDB 120. The results 114 of the reconciliation process may then be returned the client application 110 and displayed to an end user if desired. A goal of some reconciliation processes may be to end up with datasets that are free from duplicated resource objects. The datasets 124 of the CMDB 120 may have been populated with resource objects via any of various discovery processes 132. Discovery processes 132 may encounter objects from any of various provider data partitions 130A-N within the enterprise environment.

If the reconciliation engine 126 is unable to match unidentified instances of CIs in the datasets 124, the statistical rules engine 128 may apply statistical rules to reduce or eliminate the number of unidentified instances that will need manual identification, as described in more detail below. Although shown in FIG. 1 as separate from the reconciliation engine 126, the statistical rules engine 128 may be integrated with the reconciliation engine 126 in some embodiments. In other embodiments, the statistical rules engine 128 may be able to employ features of the reconciliation engine 126 in processing unidentified instances.

This approach aims to ensure data integrity and compatibility with existing and future data providers and consumers by providing the ability to reconcile resources that are currently not reconcilable without manual identification. By reducing the need for manual identification, the amount of time needed for reconciliation of datasets may be reduced.

In general, the reconciliation engine 126 may run one or more reconciliation jobs at any given time. The reconciliation engine 126 may perform any or all of the following reconciliation activities: identifying CIs that are the same entity in two or more datasets; merging datasets; comparing CIs in two or more datasets; copying CIs from one dataset to another; deleting instances from one or more datasets; purging instances that are marked as deleted from one or more datasets; and renaming datasets. The reconciliation job may be a container for different reconciling activities, which themselves can have different components. A reconciliation job may have one or more activities, each of which defines one or more datasets and rules for that activity.

Similarly, the statistical rules engine 128 may run one or more statistical identification jobs at any given time. The statistical rules engine 128 may perform any or all of the following activities: determining whether any statistical rules exist for a given CI, attempting to identify an object using a statistical rule, updating a statistical rule based on successful identification using the statistical rule, adding statistical rules, and offering suggestions to a user based on a statistical rule. The statistical identification job may be initiated by the reconciliation engine 126 or another component of the CMDB 120 as part of the processing of manual identifications.

Once the reconciliation engine 126, either automatically or through manual identification, determines that different versions of CIs represent the same entity, then the different versions of CIs may be merged into the target dataset 124. In a first stage, the reconciliation engine may apply rules from an identification ruleset against instances of objects in two or more datasets. For example, a rule intended to identify computer system instances might specify that the IP addresses of both instances be equal. When the rules find a match, both instances may be tagged with the same reconciliation identity, an extra attribute showing that they each represent the same item in their respective datasets. Instances that fail to be identified by the rules may be automatically added to the target dataset, but preferably are flagged for manual identification.

In one embodiment, the manual identification portion of reconciliation may be simplified and potentially eliminated by automatically creating statistical reconciliation rules based on previous and current manual identification experience and having ability to change acceptance criteria for those statistical rules. Such rules may be used to attempt to identify a CI after all existing regular rules have failed, and to provide a hint to the user during manual reconciliation, reducing time needed for manual reconciliation.

In one embodiment, a technique for identifying instances based on statistics and existing fingerprints of previous manual identifications may include: (1) generation of proposed rules based on a manual identification match, in which the user has an option to accept the rule, modify the rule, and the set threshold parameters for the rule; (2) utilization of statistical rules to identify CIs after regular reconciliation rules have faded as a filtering mechanism for future manual identification; and (3) automatically increasing or decreasing probability values of statistical rules based on usage patterns.

Figure 2:
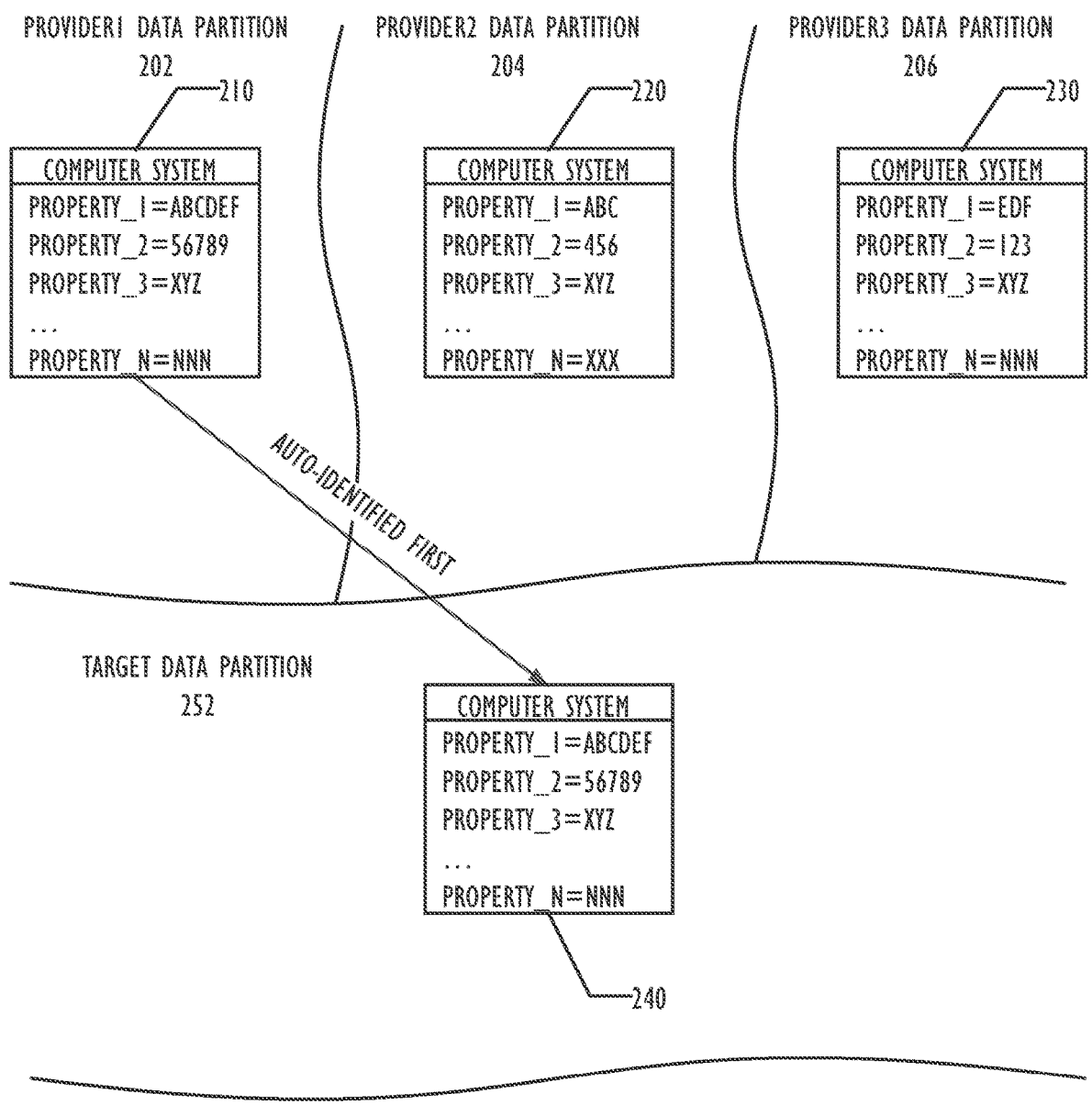
FIG. 2 illustrates, in block diagram form, an example of source and target objects for deprecation using statistical rules.

FIG. 2 is a block diagram illustrating a scenario in which there are 3 instances of CIs in import data partitions (datasets). Two of the instances are identified and one instance has already been identified in a target dataset (production data partition). When no match was found in the target data partition 252 for computer system instance 210, and a set of fingerprints for the computer system class is still empty, instance 210 may have been auto-identified, assigning a reconciliation identifier to CI 210, and copied to the target data partition 252 as CI 240.

When the reconciliation process examines computer system instance 220 in provider2 data partition 204, it may or may not match that instance with existing instance 240. If one of the regular identification rules matches, then CI 220 may generally be assigned the same reconciliation identifier as CI 240 (and CI 210) and merged into CI 240. The technique for performing the merge is outside the scope of the present invention, and merging techniques are described in U.S. patent application Ser. No. 12/570,628, entitled "Method of Reconciling Resources in the Metadata Hierarchy," filed on Sep. 30, 2009, and U.S. patent application Ser. No. 11/204,189, entitled, "Resource Reconciliation," filed on Aug. 15, 2005, which applications are hereby incorporated by reference in their entireties.

If no match is found based on existing rules, and no auto-identification is defined for this instance or data partition, then the reconciliation process sends the instance to manual identification. In this example, assume that the user decides that computer system instance 220 would be identical to computer system instance 240 because Property_3 in both instances has the same value and no identification rule for this property exists. When the user finishes manual identification of computer system instance 220, the statistical rules software may store a fingerprint that describes what led to the user to make this decision. In one embodiment, the statistical rules software may compare every property in computer system instance 220 with the same property in computer system instance 240, discovering that Property_3 is identical in both instances.

Following the compare action, a new conditional statistical identification rule may be generated for and attached to the computer system class. A new rule Identification Probability Threshold (IPT) may be set to a predefined configurable value, for example, 50%. In addition, each class may have a default Identification Probability Threshold Acceptance (IPTA), in one embodiment a number from 0 to 100, and in one example defaulted to 60. If a statistical ruleset is not empty, and one of rules in that ruleset executed successfully, and the IPT for that rule was greater than the IPTA, the rule may be automatically accepted and the CI identified. In one embodiment, if there are any additional conditional statistical rules in the ruleset, they may still be executed to allow updating the IPT for each rule, as described below.

Continuing to computer system instance 230, the reconciliation process may or may not match instance 230 with the instance 240 in the target partition 252 by using regular existing identification rules. In that situation, if the conditional statistical ruleset for the computer system class is not empty (and in this example the ruleset contains at least a conditional statistical rule requiring property 3 to match), then the conditional statistical rules in the conditional statistical ruleset for the computer system class may be executed. If any rule is successfully evaluated, indicating a match, such as by returning a value of "true," and the IPT for that rule is greater than the IPTA defined for this specific instance, class, or dataset, then computer system instance 230 may be identified and merged with computer system instance 240. If the rule is evaluated unsuccessfully, indicating no match, such as by returning a value of "false," then in one embodiment, the IPT for that rule may be adjusted negatively, reflecting the lower value of that rule. In one embodiment, if the IPT for a rule is decreased below a predetermined lower limit, the rule may be removed from the ruleset, to limit cluttering the ruleset with useless rules.

If the IPTA value is greater than the IPT value, indicating that the threshold does not meet the acceptance criteria, the CI may still go into a manual identification process, but during the manual identification, the statistical rule system may provide a hint to the user giving a list of potential CIs to match based on which of the conditional statistical rules in the ruleset returned success, in one embodiment sorted on the IPT value.

When the user chooses one of the CIs from the list to identify, the IPT for the conditional statistical rule that matched the two CIs may be updated based on a predetermined adjustment. In one embodiment, the default predetermined adjustment may be to increase the IPT value for that rule by 10%. In one embodiment, the IPT for rules that are not used to identify a match may be decreased by some predetermined negative adjustment, such as a 10% decrease in value.

Figure 3:
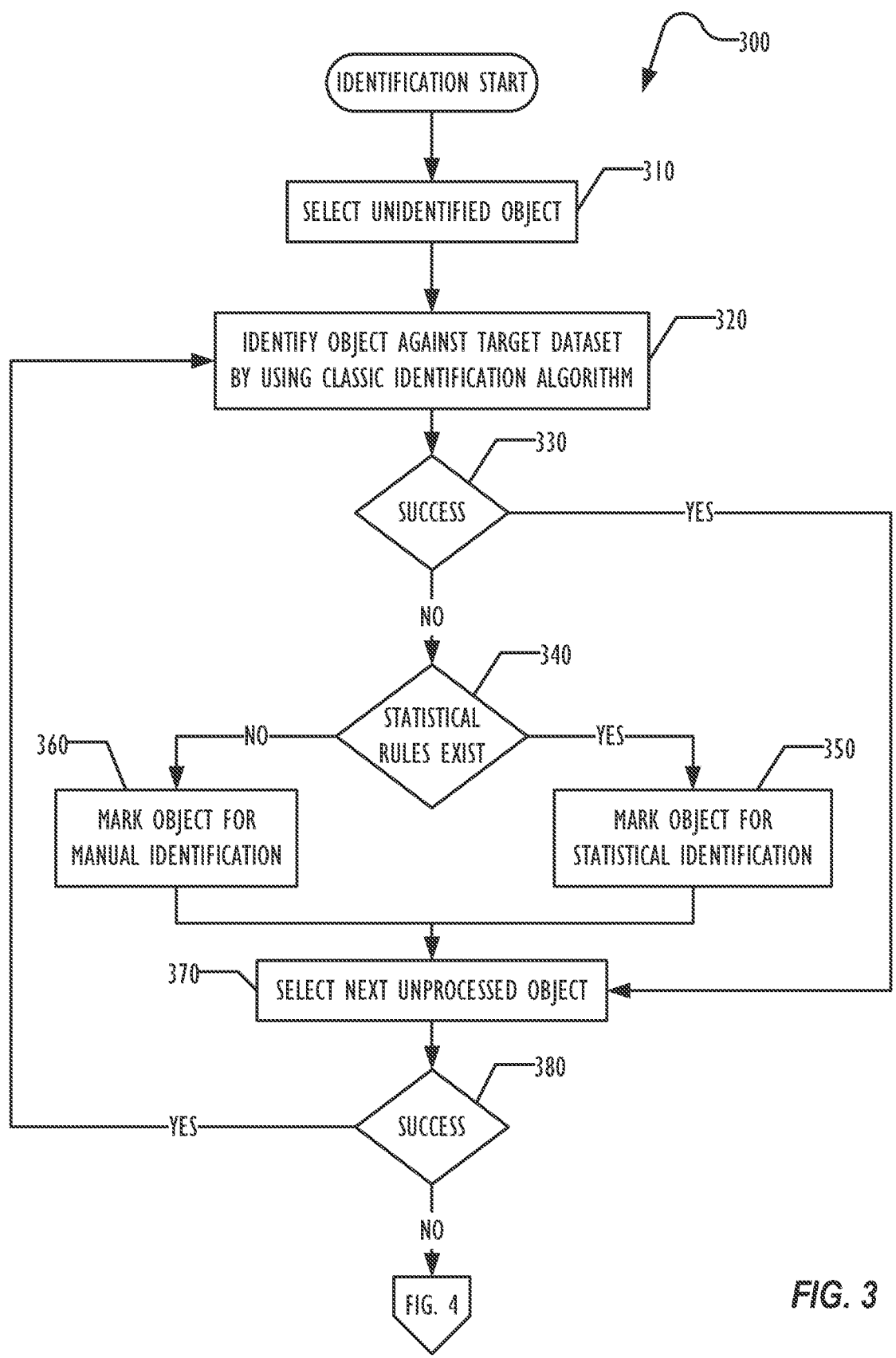
FIG. 3 illustrates, in flowchart form, a technique for identification using statistical rules according to one embodiment.

FIG. 3 is a flowchart illustrating a technique 300 for identifying objects using statistical rules according to one embodiment. As illustrated in FIG. 3, objects are first identified using conventional techniques. Then, if conventional techniques fail to identify an object, the object may be marked for statistical identification.

In block 310, an unidentified object may be selected for examination. In block 320, the unidentified object may be identified against the target dataset using conventional identification rules.

In block 330, if the identification was successful, the technique may proceed to block 370, where the next unprocessed object may be selected. If the identification was not successful using the regular rules, then in block 340 the technique may check whether any statistical rules exist for objects of the class of the object being considered. If no relevant statistical rules exist, then in block 360 the object may be marked for manual identification. If relevant statistical rules do exist, then in block 350 the object may be marked for statistical identification.

Once the unidentified object is marked for either manual or statistical identification, then in block 370 the next unprocessed object is selected. In block 380, if the selection was successful, the technique repeats the actions beginning in block 320. Otherwise, the technique moves on to the technique illustrated in FIG. 4.

The technique illustrated in FIG. 3 and described above may be performed by the reconciliation engine 126 in one embodiment.

Figure 4:
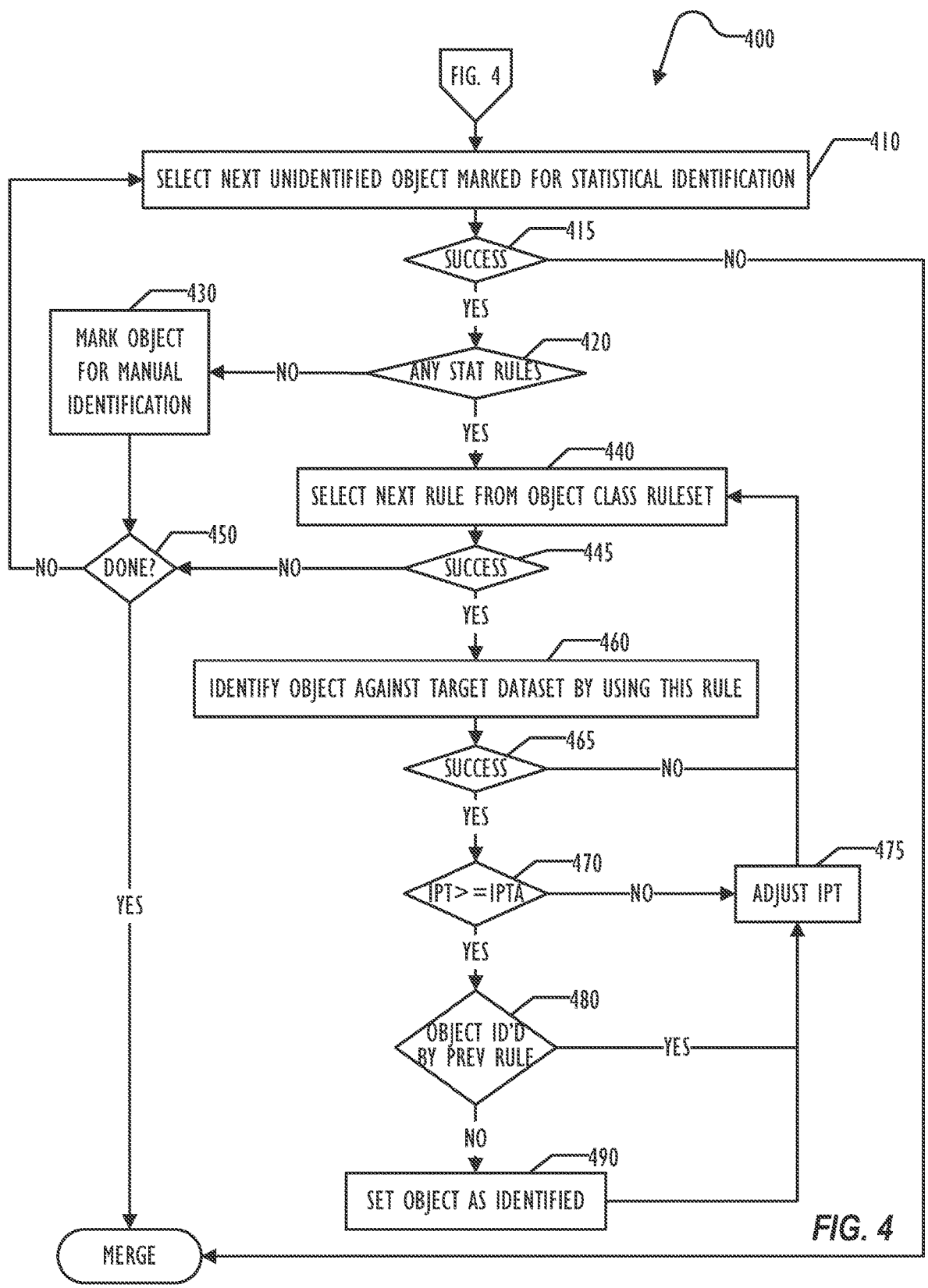
FIG. 4 illustrates, in flowchart form, a technique for identifying a source object for merger with a target object using statistical rules according to one embodiment.

FIG. 4 is a flowchart illustrating a technique 400 for performing statistical identification according to one embodiment. The technique 400 may be performed by the statistical rules engine 128 in one embodiment. Other embodiments may perform the technique 400 by other components of the CMDB 120, including the reconciliation engine 126.

In block 410, the technique may select the next unidentified CI object that has been marked for statistical identification as described above. In block 415, the technique may determine whether the selection was successful, and if the selection was unsuccessful, indicating that no additional unidentified objects have been marked for statistical identification, then the technique 400 completes and identified objects may be merged into the target dataset using conventional merge techniques.

Block 420 checks to see if there are any statistical rules applicable to the selected object, in one embodiment limiting the check to statistical rules defined for the object class of the selected CI object. If no relevant statistical rules exist, then in block 430 the selected object may be marked for manual identification. In block 450, if any additional objects remain to be considered for statistical identification, then the technique repeats beginning in block 410, otherwise, the technique 400 completes and identified objects may be merged into the target dataset using conventional merge techniques.

If any relevant statistical rules for the selected CI object exist, then beginning in block 440 each rule from the ruleset corresponding to the class of the CI object may be checked to see if it is useful for identifying the current CI object. In block 440, the next rule from the ruleset may be selected. If no more rules exist in that ruleset, as determined by block 445, then the technique 400 is finished with that CI object, and continues in block 450.

If a rule from the ruleset was selected in block 440, then in block 460 the technique 400 may attempt to identify the currently selected object as an object in the target dataset by using the selected rule. In block 465, if the rule evaluates indicating identification, the identification has been successful. In one embodiment, successful evaluation of the rule may be indicated by returning a value of "true" or any other desired value. If the rule did not successfully identify the object, then the technique repeats beginning with block 440, using the next rule in the ruleset.

If the rule successfully identified the object then in block 470 the IPT value associated with the evaluated rule is compared against the IPTA value. As described above, in one embodiment if the IPT value is greater than or equal to the IPTA value, then the statistical rule may be considered to have sufficient statistical reliability to identify the current object. In that event, in block 480 the object is checked to determine whether it has already been identified by a previous statistical rule, in one embodiment by determining whether a reconciliation identifier has been set for that object. If the object has not been identified by a previous rule, then in block 490 the object may be marked as identified.

If the statistical rule successfully identified the object against the target dataset but the IPT value was not high enough to pass the IPTA threshold for acceptance, then in block 475 the IPT value may be adjusted to reflect an improved statistical probability of usefulness. In one embodiment, this adjustment may increase the IPT value by a predetermined amount, such as a 10% increase in the IPT value. In one embodiment, the adjustment amount is configurable. In other embodiments, the adjustments may increase the IPT value by a predetermined fixed value, instead of a percentage increase. Other techniques for adjusting the value of the IPT for that statistical rule may be applied as desired.

Block 475 may be used to adjust the IPT value in other situations. For example, if the statistical rule successfully identified the object and the IPT value was high enough to accept the result of the rule, but block 480 determines that the object had already been identified with an object in the target dataset by a previous rule evaluation, then a similar adjustment of the IPT value may be performed. Similarly, if the statistical rule successfully identified the object and the object is marked as identified in block 490, then the IPT value may be adjusted in block 475 to reflect the greater confidence in the statistical rule.

Although not shown in FIG. 4, in one embodiment, if a rule fails to identify the selected CI object against an object in the target dataset, then the IPT value may be adjusted negatively, to reflect a statistical devaluation of the rule. In addition, any rule that successfully identified an object, but which did not have an IPT value sufficiently high to allow automatic acceptance, may be flagged for presentation to the user during the manual identification process described below.

In the embodiment illustrated in FIG. 4, a statistical rule that successfully identifies an object and has a sufficiently high IPT value may automatically identify that object, thus removing it from the manual identification process. Other embodiments may not provide for automatic acceptance or may configurably allow or disallow automatic acceptance.

In one embodiment, the statistical rules may be stored in a rules dataset that may be part of the CMDB 120. In other embodiments, the statistical rules may be stored in a storage medium of any desired type.

In one embodiment, statistical rulesets may be defined globally for all source and target datasets. In other embodiments, statistical rulesets may be defined separately and related to specific source datasets or specific target datasets.

Figure 5:
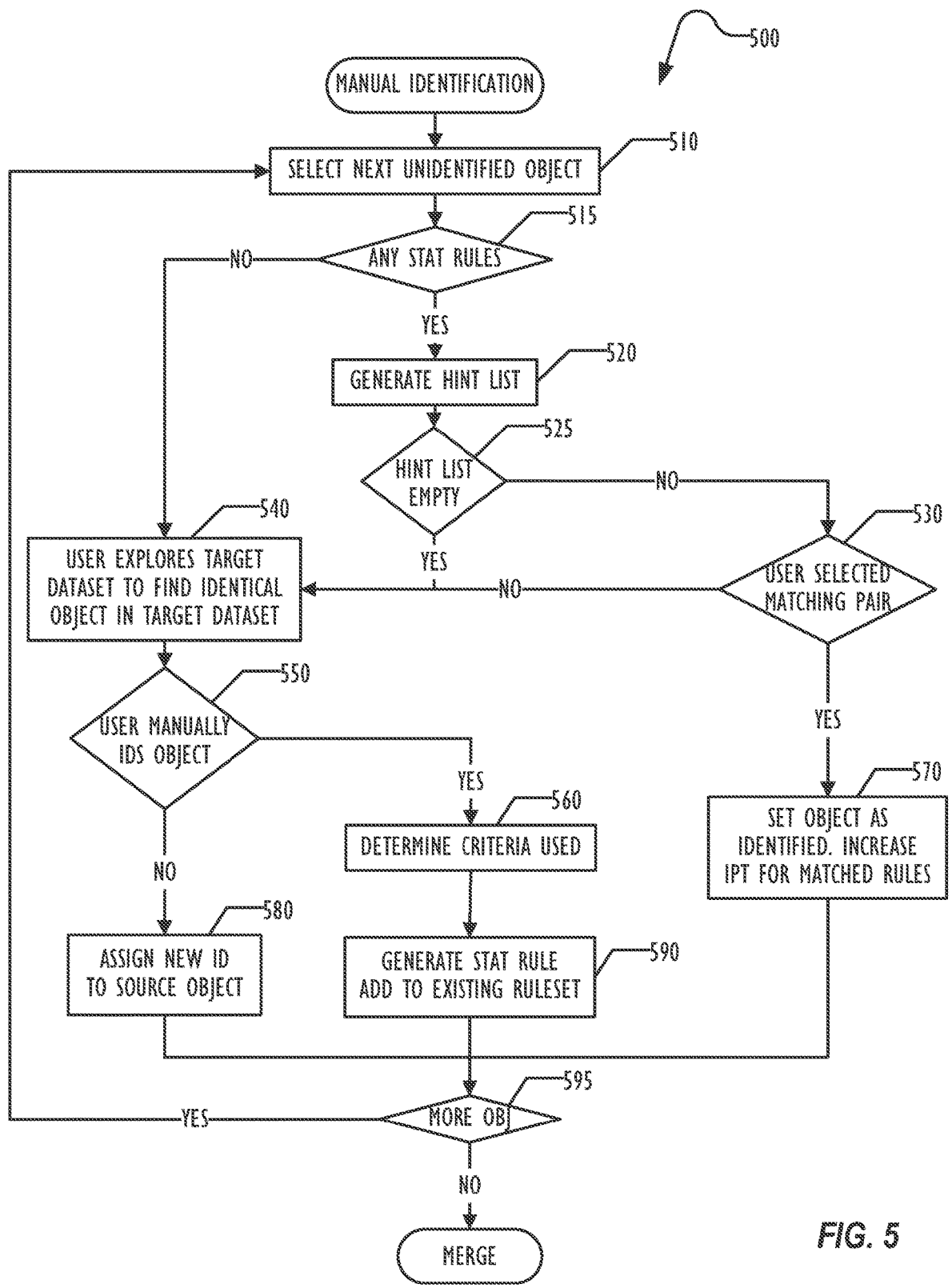
FIG. 5 illustrates, in flowchart form, a technique for manual identification using hints generated from statistical rules according to one embodiment.

FIG. 5 is a flowchart illustrating a technique 500 for manual identification using statistical rules according to one embodiment. In one embodiment, the manual identification technique 500 may be performed using the functionality of the reconciliation engine 126. In other embodiments, the manual identification technique 500 may be performed as part of the statistical rules engine 128.

In block 510, the next identified object in the source dataset may be selected for manual identification. In block 515, the statistical ruleset is checked to see if there are any statistical rules that are relevant to the current unidentified object.

If no statistical rules exist that are relevant to the current unidentified object, then in block 540, user may explore the target dataset to attempt to find identical objects in the target dataset. If the statistical ruleset contains relevant statistical rules, then in block 520 a hint list may be generated for display to the user, to assist the user in the manual identification process. The hint list may be ordered so that rules with a higher IPT value are positioned earlier in the list than rules with a lower IPT value. This tends to order the hint list so that rules that have been of greater use in the past for identifying objects in the target dataset are placed at the beginning of the hint list.

In one embodiment, the technique 400 of FIG. 4 may be performed as part of the generation of the hint list in block 520 of FIG. 5.

In block 525, if the hint list is empty, indicating that none of the statistical rules in the relevant ruleset matched an object in the source dataset with an object in the target dataset, then technique 500 may proceed to block 540 to allow the user to perform manual identification using conventional manual identification techniques. If the hint list is not empty, then the list may be displayed to the user and the user may select objects for identification based on the hint list. In one embodiment, the hint list may display information regarding the objects to be matched based upon the statistical rule, as well as information regarding the rule itself.

In block 530, if the user did not select a matching pair from the list, then the technique 500 may proceed to block 540 to allow the user to perform conventional manual identification. If the user did select a matching pair of objects based upon the hint list, then in block 570, the object from the source dataset may be marked as identified and a reconciliation identifier may be assigned to it. In addition, because the user applied a statistical rule for identification, in block 570 the IPT for the matched rule may be adjusted to reflect the greater statistical reliability of that rule, as described above. In one embodiment, if multiple rules suggested identifying an unidentified object with the same object of the target dataset, then the IPT value of all of those rules may be adjusted positively, even if the user only selected one of those rules for use in identification.

In block 550, the technique 500 determines whether the user manually identified an object in the target dataset. If the user did not manually identify an object in the target dataset as matching the source object, then in block 580 a new reconciliation identifier may be assigned to the source object, to allow it to be merged into the target dataset during the merge phase of reconciliation.

If the user did manually identify an object in the target dataset as matching the source object, then in block 560 the criteria the user used for that manual identification may be determined and used in block 590 to generate a new statistical rule to be added to the existing statistical ruleset (or to a new statistical ruleset, if none yet exists). In one embodiment, block 560 may be performed by automatically comparing all of the properties for both objects and determining which properties are equal in both the source and target objects. In a further embodiment, the user may be asked to confirm or update the criteria determination, allowing the user to fine-tune the statistical rule created by block 590.

After the source object has been processed, then in block 595 the technique 500 may determine if there are more objects to be processed for identification and if so, repeat the actions described above beginning in block 510. If block 595 determines that no more objects remain to be identified, then the technique 500 may complete, allowing the merge phase of reconciliation to begin.

In one embodiment, the number of rules to be displayed as part of the hint list may be configurable. In one embodiment, the user may be allowed to deprecate rules that are presented in the hint list that the user does not believe to be useful.

By performing statistical identification and manual identification as described above, over time the statistical rulesets may improve enough that statistical identification may be able to handle all of the unidentified objects, eliminating the need for manual identification. Even where manual identification remains necessary, the use of statistical identification may significantly reduce the number of objects that require manual identification, thus reducing the amount of time and effort required for manual identification.

Figure 6:
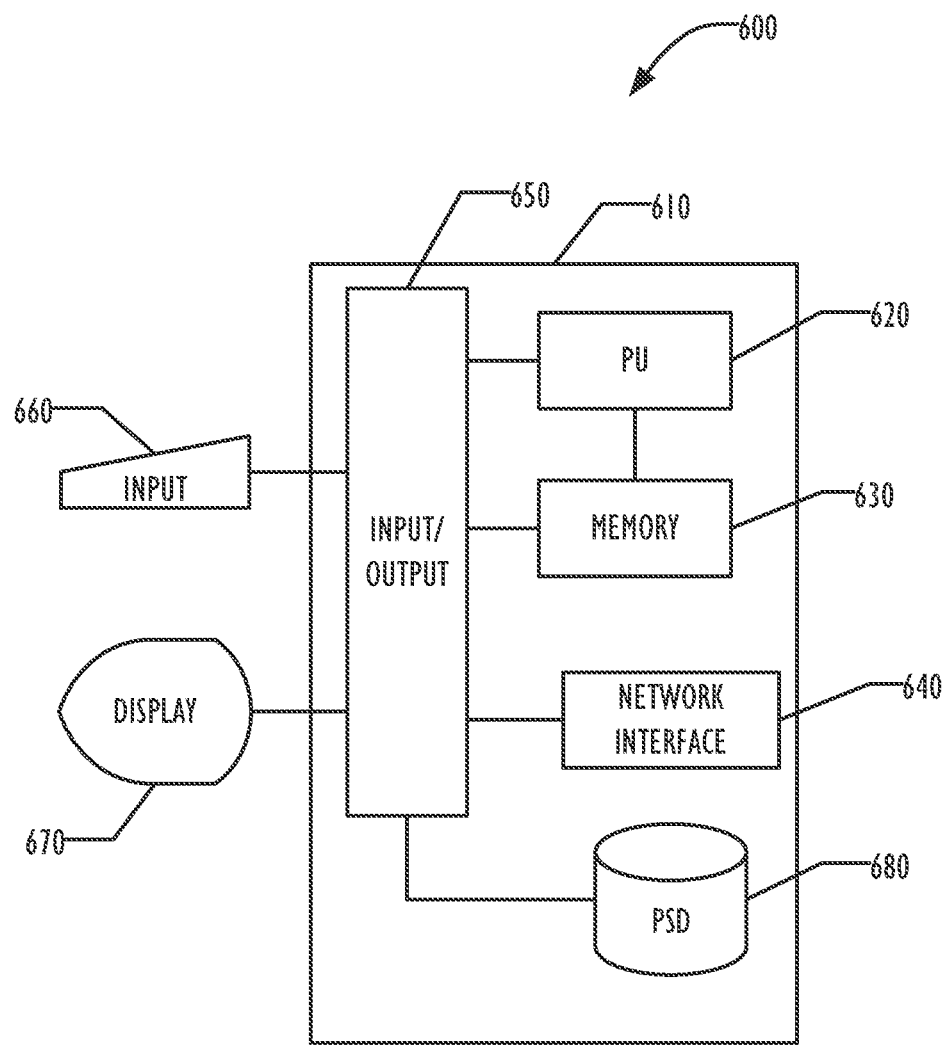
FIG. 6 illustrates, in block diagram form, a computing device for use in performing manual and statistical identification according to one embodiment.

Referring now to FIG. 6, an example computer 600 for use in providing a statistical rules engine for performing the techniques described above is illustrated in block diagram form. Example computer 600 comprises a system unit 610 which may be optionally connected to an input device or system 660 (e.g., keyboard, mouse, touch screen, etc.) and display 670. A program storage device (PSD) 680 (sometimes referred to as a hard disc) is included with the system unit 610. Also included with system unit 610 is a network interface 640 for communication via a network with other computing and corporate infrastructure devices (not shown). Network interface 640 may be included within system unit 610 or be external to system unit 610. In either case, system unit 610 will be communicatively coupled to network interface 640. Program storage device 680 represents any form of non-volatile storage including, but not limited to, all forms of optical and magnetic, including solid-state, storage elements, including removable media, and may be included within system unit 610 or be external to system unit 610. Program storage device 680 may be used for storage of software to control system unit 610, data for use by the computer 600, or both.

System unit 610 may be programmed to perform methods in accordance with this disclosure (examples of which are illustrated in FIGS. 3-5). System unit 610 comprises a processor unit (PU) 620, input-output (I/O) interface 650 and memory 630. Processing unit 620 may include any programmable controller device including, for example, one or more members of the Intel Atom®, Core®, Pentium® and Celeron® processor families from Intel Corporation and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Memory 630 may include one or more memory modules and comprise random access memory (RAM), read only memory (ROM), programmable read only memory (PROM), programmable read-write memory, and solid-state memory. One of ordinary skill in the art will also recognize that PU 620 may also include some internal memory including, for example, cache memory.

Figure 7:
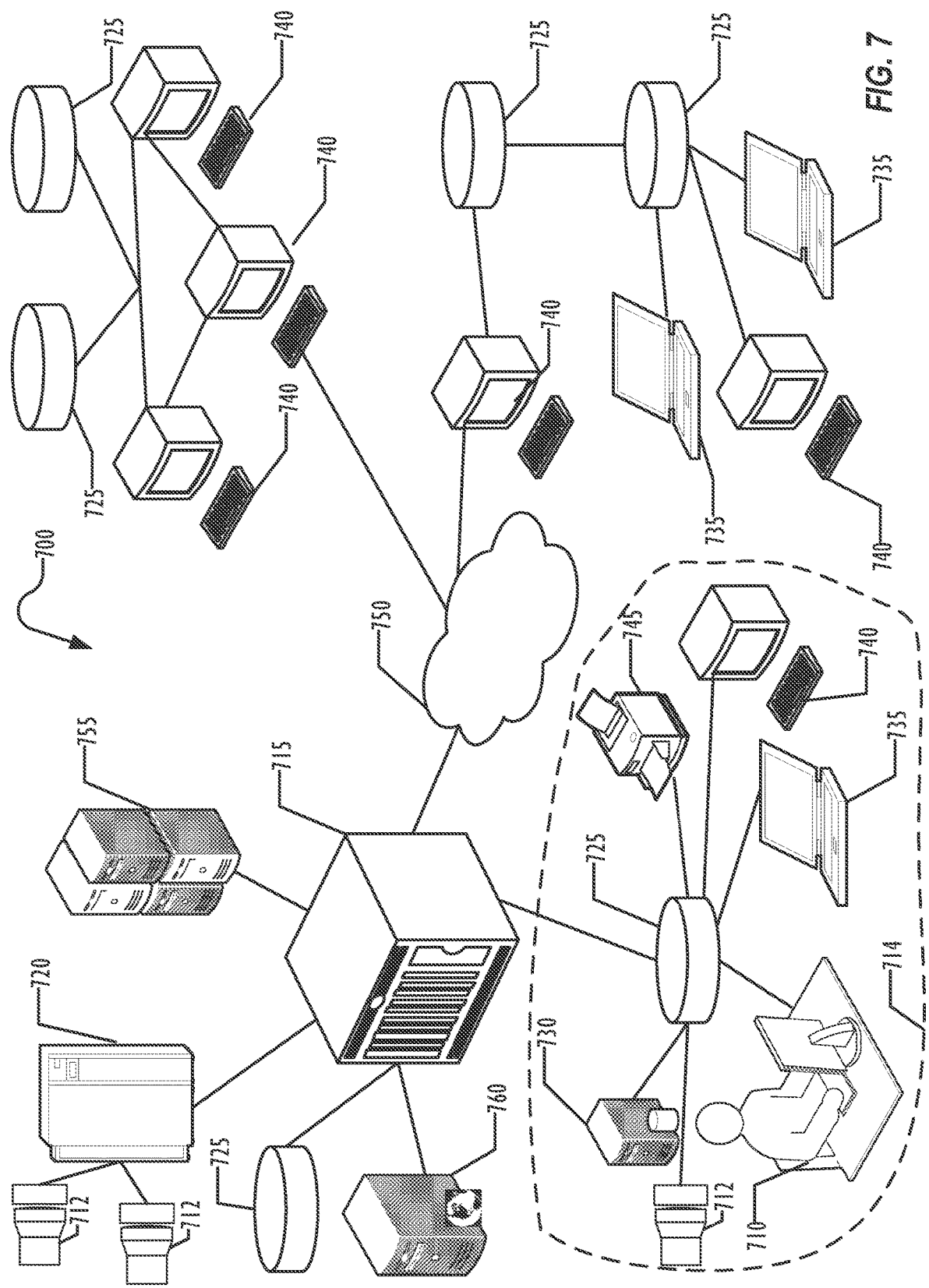
FIG. 7 illustrates, in block diagram form, an enterprise computing environment according to one embodiment in which techniques for manual and statistical identification may be performed.

FIG. 7 illustrates an exemplary enterprise computing environment 700 wherein one embodiment of the present invention may be installed. The enterprise computing environment may be connected in any way known to the art, including using switches or routers 715 and networks 750. The CMDB 120 may be installed and running on any one or more of the computing endpoints in communication with the network 750 illustrated in FIG. 7. As shown, the enterprise computing environment may include one or more computers, for example, mainframe computers 720, which each include or are connected to one or more storage devices 725, also referred to as direct access storage devices (DASD). A plurality of computer systems or terminals 712 may be coupled to the mainframe computer 720, wherein the computer systems or terminals 712 access data stored in the storage devices 725 coupled to or part of the mainframe computer 720. The enterprise computing environment may further include other resources, such as a printer 745.

A user 710 may use a terminal or workstation to access CMDB software to display information about the CMDB 120 on a display associated with the workstation or to make reconciliation requests. The software generating the display on the user 710 workstation display or generating the reconciliation requests may execute on the workstation for the user 710 or on other computing resources of the enterprise computing environment 700, such as a mainframe 720, a web server 760, a database server 730, an application server 755, and other workstations 740 and portable computers 735.

The mainframe computer system 720 may be coupled to one or more other computer systems and/or computer networks, including other mainframe computer systems. The mainframe computer system 720 may be coupled locally to a computer system network 714 in a local area network (LAN) configuration, or may be coupled to one or more computer systems and/or networks through a wide area network (WAN), such as the network 750. As shown in FIG. 7, the mainframe computer system 720 may be coupled to a LAN 714, such as a PC-based or client/server based network via a router or switch 715 or directly coupled to the LAN 714. Similarly, the user 710 may access elements of the enterprise computing environment through the LAN 714 or the network 750. The LAN 714 may comprise a storage device or file server 725 coupled to one or more desktop computer systems 740, one or more portable computer systems 735 and possibly one or more computer systems or terminals 712. As also shown in FIG. 7, the mainframe computer 720 may also be coupled through a wide area network 750, to one or more additional local area networks, such as PC-based networks as shown. Each of the PC based networks may comprise one or more storage devices or file servers 725 and one or more of either desktop computer systems 740 or portable computer systems 735. The wide area network 750 may be any of various types, such as the Internet.

Each of the one or more mainframe computer systems 720, the computer systems 740 and 735, as well as file servers 725 may include various components as is standard in computer systems. For example, the mainframe computer system 720 may include one or more processors or CPUs, preferably multiple CPUs, as well as non-volatile memory, such as represented by elements 725, and various internal buses etc. as is well known in the art, as well as a display device. In a similar manner, each of the desktop computer systems 740 and/or portable computer systems 735, or other computer systems included within the enterprise, comprise various standard computer components including one or more CPUs, one or more buses, memory, a power supply, non-volatile memory, and a display, such as a video monitor or LCD display, such as describe above in the description of FIG. 6. The computer systems or terminals 712 may comprise standard "dumb" terminals as used with mainframes, i.e., may comprise a display and video hardware and/or memory for displaying data on the display provided from the mainframe computer system 720.

The mainframe computer system 720 may store a database comprising data which is desired to be accessible among a portion or all of the enterprise, e.g., is desired to be accessible by one or more of the computer systems 740 and 735. The database stored in the mainframe computer system 720 may be distributed among one or more of the various file servers 725 connected to the various computer systems 740 and 735. Thus, it is desired that the data comprising the database be distributed among the enterprise for ready access among multiple users. It is also possible that multiple different database management systems are used within the enterprise, e.g., one or more of the file servers 725 may store its own database which is desired to be replicated among various of the other file servers and/or the mainframe computer system 720.

One or more of the computer systems 720, 740, and 735 preferably include a storage medium on which computer programs according to the invention may be stored. In addition, the storage medium may be located in a first computer in which the programs are executed, or may be located in a second different computer that connects to the first computer over a network. In the latter instance, the second computer provides the program instructions to the first computer for execution. Also, the computer systems and terminals 712, 720, 725, 740, and 735 may take various forms, including a personal computer system, mainframe computer system, workstation, network appliance, Internet appliance, personal digital assistant (PDA), television system or other device. In general, the term "computer system" can be broadly defined to encompass any device having a processor that executes instructions from a memory medium.

The storage medium preferably stores a software utility program or programs for graphically displaying database record organization characteristics as described herein. The software program(s) may be implemented in any of various ways, including procedure-based techniques, component-based techniques, and/or object-oriented techniques, among others. For example, the software program may be implemented using ActiveX® controls, C++ objects, Java® objects, Microsoft Foundation Classes (MFC), or other technologies or methodologies, as desired. (ACTIVEX is a registered trademark of the Microsoft Corporation. JAVA is a registered trademark of Sun Microsystems, Inc.) A computer system executing code and data from a memory medium comprises a means for graphically displaying database record organization according to the methods and/or block diagrams described below.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method comprising:
   receiving a match of a first configuration item and a second configuration item from a user in a manual identification process, the first configuration item and the second configuration item sharing a first class;
   determining that a value of a first property is shared between the first configuration item and the second configuration item;
   generating a statistical rule responsive to determining that the value of the first property is shared, the statistical rule being for the first class and identifying the first property; and
   using the statistical rule to simplify a manual identification portion of a subsequent reconciliation process for configuration items sharing the first class.

2. The method of claim 1, the statistical rule is generated with a default value for a probability threshold, the default value being below a predetermined acceptance value.

3. The method of claim 2, wherein the default value is a value for the first class.

4. The method of claim 2, wherein the predetermined acceptance value is a value for the first class.

5. The method of claim 2, wherein generating the statistical rule includes:
   obtaining the default value from the user.

6. The method of claim 2, wherein using the statistical rule to simplify the manual identification portion of a subsequent reconciliation process for a third configuration item and a fourth configuration item includes:
   determining that the third configuration item and the fourth configuration item share the first class;
   identifying the statistical rule as applying to the first class;
   determining, based on the statistical rule, that the third configuration item and the fourth configuration item share a value for the first property;
   determining that the value for the probability threshold for the statistical rule is equal to or greater than the predetermined acceptance value; and
   automatically matching the third configuration item with the fourth configuration item.

7. The method of claim 1, wherein using the statistical rule to simplify the manual identification portion of a reconciliation process for a third configuration item and a fourth configuration item includes:
   determining that the third configuration item and the fourth configuration item share the first class;
   identifying the statistical rule as applying to the first class,
   determining, based on the statistical rule, that the third configuration item and the fourth configuration item share a value for the first property; and
   providing a user with a suggested match between the third configuration item and the fourth configuration item based on the statistical rule.

8. The method of claim 7, wherein the statistical rule is generated with a default value for a probability threshold and the method further comprises:
   increasing the value of the probability threshold for the statistical rule responsive to receiving selection of the suggested match provided by the statistical rule.

9. The method of claim 8, wherein the statistical rule is a first statistical rule and the method further comprises:
   identifying a second statistical rule as applying to the first class, the second statistical rule identifying a second property;
   determining, based on the second statistical rule, that the third configuration item and the fourth configuration item share a value for the second property;
   providing the user with a suggested match between the third configuration item and the fourth configuration item based on the second statistical rule; and
   responsive to receiving selection of the match provided by the first statistical rule, decreasing the value of the probability threshold for the second statistical rule.

10. The method of claim 7, wherein the statistical rule is generated with a default value for a probability threshold, the default value being below a predetermined acceptance value and the method further includes:
    determining that the value of the probability threshold is lower than the predetermined acceptance value, wherein providing the user with the suggested match is responsive to determining that the value of the probability threshold is lower.

11. The method of claim 1, wherein generating the statistical rule further includes:
obtaining confirmation from the user that the first property was used in the manual identification.

12. A system comprising:
at least one processor;
a configuration management database having at least one target dataset of configuration items; and
memory storing instructions that, when executed by the at least one processor, cause the system to perform operations including:
generating a proposed statistical rule for matching a first configuration item in a source dataset with a second configuration item in the target dataset based on a user's manual match of the first configuration item with the second configuration item, the proposed statistical rule including properties shared between the first configuration item and the second configuration item,
displaying the properties shared between the first configuration item and the second configuration item to the user,
receiving, from the user, selection of at least some of the properties shared between the first configuration item and the second configuration item, and
storing the selected properties as a statistical rule, the statistical rule being used to simplify a subsequent manual identification portion of a reconciliation process for configuration items.

13. The system of claim 12, wherein the first configuration item, the second configuration item, and the statistical rule are associated with a class of items.

14. The system of claim 12 wherein storing the statistical rule includes storing the statistical rule with a threshold value that is lower than a threshold acceptance value.

15. The system of claim 14, wherein the user provides the threshold value.

16. The system of claim 14, the memory further storing instructions that, when executed by the at least one processor, causes the system to perform operations including incrementing the threshold value when the statistical rule is used by a user in a subsequent manual identification to match configuration items.

17. The system of claim 16, the memory further storing instructions that, when executed by the at least one processor, causes the system to perform operations including automatically matching configuration items using the statistical rule in a subsequent manual identification portion after the threshold value is increased to at least the threshold acceptance value.

18. A method for reconciling a configuration management database comprising:
receiving a first configuration item from a source dataset;
determining whether the first configuration item matches a second configuration item of a target dataset of the configuration management database based on application of a plurality of predefined rules;
responsive to a successful match based on application of the plurality of predefined rules, automatically marking the first configuration item as identified with the second configuration item; and
responsive to an unsuccessful match based on application of the plurality of predefined rules, marking the first configuration item for manual identification and generating a hint list, the hint list for display to a user to assist the user in a manual identification process.

19. The method of claim 18, wherein the hint list is ordered by a probability measure.

20. The method of claim 19, wherein the hint list for display to a user includes the display of the probability measure.

21. The method of claim 18, further comprising updating at least one of the plurality of predefined rules based on a user selection from the manual identification process.

\* \* \* \* \*